Patented June 4, 1946

2,401,293

UNITED STATES PATENT OFFICE 2,401,293

STABLE VITAMIN CONTAINING PRODUCTS

Loran O. Buxton, Newark, and Harry J. Konen, East Orange, N. J., assignors to National Oil Products Company, Harrison, N. J., a corporation of New Jersey No Drawing. Application May 7, 1942, Serial No. 442,079

8 Claims. (Cl. 99—11)

This invention relates to stable vitamin-containing food products and more particularly to dry food products containing fat-soluble vitamins in a stable form.

Much work has been done in the prior art in the preparation of fat-soluble vitamin-containing food products in a dry form. One of the problems involved has been to produce such products which are substantially unchanged in taste and odor by having vitamin materials added thereto. However, by far the greatest problem involved has been to devise means of inhibiting the oxidative destruction of the vitamins after they have been incorporated into the dry carrier.

It is rather common practice for feed manufacturers and farmers to incorporate fat-soluble vitamin-containing materials, e. g., cod liver oil, sardine oil, etc., into poultry and animal feeds in order to fortify such feeds with vitamins A and D. However, the vitamins which are contained in such stock feeds are readily susceptible to oxidative deterioration and destruction; consequently, it is necessary in order to provide feeds with the proper vitamin potency to admix the vitamin-containing material therewith only shortly before feeding the stock food. Various proposals have been made for the production of stable vitamin-containing materials of high potency in a dry, granular form which may be admixed with stock and poultry feeds in order to provide vitamin-fortified feeds which are stable over a relatively long period of time. However, as yet, no stable satisfactory products have been made available.

One proposal has been made to add small amounts of vitamin-containing materials to vegetable meals containing at least 5 per cent of fatty material; however, such a proposal has not proved to be entirely satisfactory. Another suggestion has been to impregnate dried yeast with cod liver oil and then to coat the impregnated particles with Karaya gum by dispersing the yeast particles in a solution of the gum and subsequently drying the coated particles. Another proposal has been to mix fish liver oils with liquid paraffin wax and then to impregnate dry, granular vegetable material therewith, and cooling the mass to give vegetable particles coated and/or impregnated with a vitamin-containing oil enclosed in a film of paraffin wax. A further proposal has been to combine a wax and a gum in a similar process. The use of waxes, gums, etc., to protect vitamins against oxidizing influences of the atmosphere is not very satisfactory, since not only have the products not proved to be very stable as regards the destruction of the vitamins, but also the use of waxes and gums is highly undesirable from a physiological standpoint, since such materials are not readily assimilable by the body. Also, such substances tend to interfere with the proper absorption by the body of the vitamins contained in the food or feed.

It is the object of this invention to provide improved fat-soluble vitamin-containing food products in substantially dry form.

A further object of the invention is to provide fat-soluble vitamin-containing food products in dry form having enhanced stability.

Another object of the invention is to provide improved products for fortification of foods for human and animal consumption comprising a vitamin A and/or D containing material dispersed in a dry carrier, the vitamins contained therein being highly stable towards deteriorative oxidation.

Other objects of the invention will in part be obvious and will in part appear hereinafter.

We have found that highly stable fat-soluble vitamin-containing food products may be readily prepared by intimately mixing fat-soluble vitamin-containing material with comminuted or otherwise finely divided vegetable material capable of absorbing large amounts of fatty material and preferably a vegetable material containing relatively large amounts of natural antioxidants. The mixture thus obtained is then intimately mixed with a relatively large amount of crude vegetable oil; however, in all cases keeping the oil content of the product below a point where the product would tend to lose its dry characteristics and become oily. The products which are produced by this process are dry, granular or otherwise finely divided and may be readily admixed with poultry and stock feeds or with various food products for human consumption, such as cereals, flour, etc., or used for other suitable purposes. The vitamin content of these products is very stable and little or no destruction thereof will result even on storing these products under atmospheric conditions for relatively long periods of time. Alternatively, the vitamin-containing products may be prepared by a one-step process; that is, the vitamin-containing material may be dissolved in the crude vegetable oil and the mixture of the crude vegetable oil and the vitamin-containing material admixed with the dry, finely divided vegetable material all at one time.

When the process is carried out by either of the two embodiments set forth above, the crude vegetable oil as it is absorbed into the cellular structure of the finely divided vegetable material carries with it the fat-soluble vitamin-containing material. The fat-soluble vitamins are thus completely isolated from the oxidizing influences of the atmosphere. Furthermore, by thus being carried into the innermost cellular structure of the vegetable material, the fat-soluble vitamins are brought into intimate contact with the natural antioxidants of the vegetable material. These antioxidants as well as the natural antioxidants contained in the crude vegetable oil further protect the fat-soluble vitamins from deterioration by oxidizing influences. The conjoint action of these three factors, i. e., the physical exclusion from the atmosphere and its oxidizing influences, the protection afforded by the natural antioxidants of the finely divided vegetable material, and protection provided by the natural antioxidants contained in the crude vegetable oil, is so effective in protecting the fat-soluble vitamins from oxidative deterioration and destruction that no loss in vitamin D potency and little or no loss of vitamin A potency in the final product will result over periods of six months and longer even though the carrier is stored under conditions which are conducive to oxidation and destruction of the vitamin content thereof. Feed manufacturers have been trying for years to obtain the results made available by this invention.

By merely mixing an ordinary vitamin-containing oil, e. g., cod liver oil, sardine oil, etc., with an ordinary stock or poultry feed no such results will be obtained. Some absorption of the vitamin-containing oil into the feed will take place, but a large proportion of it will remain on the outer surface of the feed particles and be readily susceptible to oxidation and destruction. Furthermore, such oxidation will induce oxidation of any vitamin-containing material that may have been absorbed into the cell structure of the feed material. Consequently, the result is that such feeds lose their vitamin potency very rapidly, oftentimes the major proportion of the vitamin A content being destroyed in only a few days.

Any finely divided vegetable material which is capable of absorbing large amounts of fatty material may be employed. It is preferred that the vegetable material contain only a relatively small amount of fatty material; suitable vegetable materials include, inter alia, wheat germ, pressed cake flour, corn oil meal, dried distiller's grain solubles (dried distiller's corn and/or rye solubles), linseed oil meal, mixtures of these meals, etc. Mixtures of such meals with minor portions of other meals which do not have as great an affinity for fatty materials, e. g., soy bean meal, oat meal, wheat bran, corn germ meal, etc., may also be employed. The vegetable materials just mentioned which do not have as high an affinity for fatty materials as is necessary to make them suitable for use as the carrier alone for the vitamin-containing material may be fortified with fat-soluble vitamins as above described and the oily mixture then treated with a suitable organic solvent in order to eliminate the oiliness of the mass; for example, these meals may be treated with solvents such as methanol, ethanol and isopropanol containing at least 9 per cent of water and similar highly polar solvents substantially immiscible with fatty materials. Such treatment in some manner or other appears to increase the affinity of these vegetable materials for fatty materials so that they may be employed alone in the process of the invention, if desired. Apparently, the solvent affects the cellular structure of the vegetable material in such a manner as to make it more readily permeable by the crude vegetable oil, and once the crude oil containing the vitamins is absorbed into the cell structure it tends to remain there. On removal of the solvent by evaporation or other suitable means, the permeability of the cell is restored to what it was before; but now the crude vegetable oil and the fat-soluble vitamins are inside the cell where they are protected from the atmosphere. These vegetable materials and the vegetable materials which do not require such a treatment to increase their affinity for fatty materials may be treated with such solvents as mentioned hereinabove for the purpose of liberating natural antioxidants, which are so intimately associated with the cell structure that they do not provide as much protection for the fat-soluble vitamins as possible. The solvent treatment aids in making the antioxidants more readily available to the vitamin-containing materials which are added and thus further aids in maintaining the stability of the final product. Furthermore, if desired, these vegetable materials may be formed into an aqueous slurry by the addition thereto of water and intimately mixing the mass. Such treatment will also tend to liberate natural antioxidants from the vegetable materials and make them more readily available to the vitamin-containing materials. The water may then be removed from the aqueous slurry by any suitable means, e. g., vacuum distillation and the resulting dried product reduced to a finely divided form by grinding or other suitable means before employing it in the process of the invention. It is preferred in all instances that the vegetable material which is employed be one which contains the majority of the natural antioxidants originally present therein and associated therewith.

Any suitable natural or synthetic material rich in any one or more of the fat-soluble vitamins, e. g., A, D, E and K, may be used in producing the products of the invention, the corresponding pro-vitamins being included under the generic expression "vitamins." It is preferred to use animal, vegetable or fish oils rich in the fat-soluble vitamins such as cod liver oil, shark liver oil, halibut oil, sardine oil, tuna liver oil, palm and like oils, concentrates thereof or such oils fortified with vitamin concentrates. Other sources of the fat-soluble vitamins such as antirachitic activated sterols and the like may also be used either alone or in combination with any of the aforementioned or other vitamin-containing materials. While the process of the invention is particularly directed to the production of products containing fat-soluble vitamins and while the vegetable materials employed in producing these products ordinarily contain vitamins $B_1$ and riboflavin, these two vitamins, as well as other water-soluble vitamins, e. g., vitamin C, pantothenic acid, niacin, biotin, pyridoxine, etc., may be incorporated into the vitamin food product if desired.

The crude vegetable oils which are employed in the process of the invention are preferably such oils which contain relatively large amounts of natural antioxidants or fractions of these oils containing concentrated therein the natural antioxidants of the oil. Suitable oils which may be used in the process of the invention include, inter alia, crude oils such as crude corn oil, crude corn germ oil, crude soy bean oil, crude cottonseed oil, crude wheat germ oil, crude peanut oil, crude palm oil, crude cocoanut oil, crude sesame seed oil, crude rice bran oil, etc. Fractions produced from such oils by processes such as vacuum distillation or the process of copending application of L. O. Buxton, Serial No. 351,909, filed August 8, 1940, and which contain the major portion of the antioxidants originally associated with the oil may also be utilized in preparing products of the invention.

In carrying out the process of the invention, any suitable fat-soluble vitamin-containing material is intimately mixed with the finely divided vegetable material or mixture of such vegetable materials to be employed as the carrier. It is preferred to employ a vegetable meal for this purpose, and the process of the invention will be described with reference to the production of the vitamin product utilizing a vegetable meal as the carrier. The vitamin-containing material is added to the vegetable meal or mixture of meals being employed and the mass intimately and thoroughly mixed by any suitable means, for example in a mechanical feed mixer, or the like. The amount of vitamin-containing material which is mixed with the vegetable meal will vary, depending upon the potency of the vitamin-containing material and upon the potency which is desired in the final product. However, in most instances, less than 10 per cent of the total mass will consist of the vitamin-containing material. When the vegetable material and the vitamin-containing material have been thoroughly mixed, the crude vegetable oil is then added thereto and the mass thoroughly and intimately mixed again in order to obtain intimate contact of the crude vegetable oil with the vegetable meal and the vitamin-containing material. The crude vegetable oil is readily absorbed by the vegetable meal, and apparently in the process, as pointed out hereinabove, the vitamin-containing material is incorporated into the cells of the vegetable material and protected from the oxidizing influences of the atmosphere, both by being coated and protected from the atmosphere by means of the vegetable material and the crude vegetable oil and also by the influence of the natural antioxidants contained in the crude vegetable meal and the crude vegetable oil. Ordinarily, from about 3 per cent to about 20 per cent of crude vegetable oil is incorporated into the product, in all cases the amount of vegetable oil incorporated being equal to or greater than the amount of vitamin-containing material incorporated. In all instances, it is preferred that a product be obtained which has a total fat content of at least 5 per cent and preferably not over 30 per cent; however, these values will be varied, depending upon the absorptive properties of the vegetable material employed. In all instances, a stable, dry product highly suitable for use in fortifying various types of foods and feeds is obtained. Also, if desired, the product of the invention may, in some instances, be utilized as a food per se.

In certain instances, the fat-soluble vitamin-containing material may be dissolved in a minor portion (up to 50 per cent) of the crude vegetable oil used in the process prior to admixture with the vegetable carrier. In such a case, a portion of the crude vegetable oil will be simultaneously incorporated into the solid carrier, along with the fat-soluble vitamins; and the balance of the crude vegetable oil will be incorporated into the carrier subsequent thereto.

Alternatively, as described hereinabove, the product may be prepared by dissolving the fat-soluble vitamin-containing material in the crude vegetable oil, and then admixing the crude vegetable oil solution of the fat-soluble vitamins with the vegetable material to obtain the desired product. Thus, the vitamins and the crude vegetable oil are incorporated into the vegetable material in one step, thus somewhat simplifying the process; however, the results obtained by this process are not as good as when the vitamin-containing material is first admixed with the vegetable material, with the subsequent addition of the crude vegetable oil.

If it is desired to employ vegetable materials which do not have the required affinity for fatty materials, the vegetable material, the crude vegetable oil and the vitamin-containing material may be admixed by either of the above-described processes; and the product obtained, which will be somewhat oily, may then be contacted with an organic solvent substantially immiscible with fatty materials. As previously described, such a treatment appears to increase the affinity of the vegetable material for fatty material; and when the solvent is removed by some suitable means, e. g., evaporation under reduced pressure, it will be found that the product which originally was of an oily nature is now non-oily, dry, and free flowing. Solvents suitable for so treating the vegetable material include methanol, ethanol, isopropanol containing at least 9 per cent of water, and similar highly polar organic solvents substantially immiscible with fatty materials. When so treating vegetable material, it is preferred to use about 1 part of solvent, by volume, to each 2 parts, by weight, of carrier, e. g., 1 ml. of solvent to 2 gms. of carrier. The solvent treatment is also quite useful in some instances for treating the products prepared from vegetable meals having a relatively high affinity for fatty materials, particularly when the larger amounts of fatty material have been incorporated into the product.

In some instances, if desired, antioxidants may be added to the dry product, employing either water-soluble or oil-soluble antioxidants. However, it is seldom necessary that this be done, since in all cases a very stable product is obtained by the process of the invention.

In order to minimize any oxidation or destruction of the vitamins during the process, it is preferred that all mixing operations be carried out under an inert atmosphere such as an atmosphere of nitrogen or carbon dioxide.

For a fuller understanding of the nature and objects of the invention, reference should be had to the following examples which are given merely to further illustrate the invention and are not to be construed in a limiting sense, all parts given being by weight.

*Example I*

15 parts of a vitamin ester concentrate containing 230,000 I. U. of vitamin A and a corresponding high content of vitamin D were thoroughly mixed with 60 parts of virgin soybean oil. The soybean oil-ester concentrate mixture was then added to 319 parts of linseed oil meal and the mass fairly well mixed. 106 parts of wheat germ press cake flour were then added and the mass thoroughly and intimately mixed. At the end of four months, the vitamin A potency of the dry carrier was still the same as when it was originally prepared, i. e., slightly over 6,300 I. U. of vitamin A/gm., even though the carrier had been stored in an open container exposed to the atmosphere.

Example II

A dry carrier was prepared essentially as in Example I, except that instead of using a mixture of 3 parts of linseed oil meal to 1 part of wheat germ pressed cake flour as in Example I for the finely divided vegetable material, a mixture of 2 parts of dried distiller's corn solubles and 1 part each of linseed oil meal and wheat germ press cake flour were employed. Also, only 35 parts of virgin soybean oil were employed, instead of 60 parts as in Example I. A dry, free-flowing, non-oily product having a vitamin A potency of about 6,400 I. U./gm. was obtained. After being stored for five months in an open container, only slightly over 1 per cent of the vitamin A had been destroyed.

Example III 6 parts of an antirachitic activated sterol having a potency of 200,000 I. U. of vitamin D/gm. were dissolved in 69 parts of virgin soybean oil. The crude vegetable oil containing the vitamin dissolved therein was then mixed in a mechanical mixer with 319 parts of dried distiller's corn solubles and 106 parts of linseed oil meal. The non-oily, finely divided, free-flowing product which was obtained had a vitamin D potency of over 2200 I. U./gm. At the end of six months' storage in contact with air in an oven at a temperature of 37.5° C., the potency of the vitamin product was unchanged.

Example IV 25 parts of a vitamin ester concentrate containing about 230,000 I. U. of vitamin A/gm. were admixed with 50 parts of virgin soybean oil, and the resulting solution thoroughly admixed with 425 parts of wheat germ pressed cake flour in a mechanical mixer. The product obtained, which was dry, non-oily, and free flowing, had a potency of 12,000 I. U. of vitamin A/gm., and was highly suitable for the fortification of cereals, flours, and other foods for human consumption. After six months' storage at room temperature in contact with the atmosphere, the product had a vitamin A potency of 11,400 I. U./gm.

Example V 5 parts of a vitamin A alcohol concentrate containing 1,125,000 I. U. of vitamin A/gm. were dissolved in 20 parts of virgin soybean oil, and the resulting solution thoroughly admixed with 425 parts of wheat germ pressed cake flour in a mechanical mixer. The resulting product was then thoroughly admixed with 50 parts of virgin soybean oil. The product obtained, which was dry, non-oily and free flowing, had a potency of 11,800 I. U. of vitamin A/gm. After six months' storage at room temperature in contact with the atmosphere, the product had a vitamin A potency of 10,700 I. U./gm.

Example VI 45 parts of a vitamin A ester concentrate containing approximately 260,000 I. U. of vitamin A per gram and 16.5 parts of an antirachitic activated sterol having a vitamin D potency of 200,000 I. U. of vitamin D/gm. were premixed and the resulting solution admixed with a mixture of 1000 parts of linseed oil meal and 335 parts of wheat germ pressed cake flour in a mechanical mixer under vacuum of about 29 inches. 103.5 parts of crude soybean oil were then added to this fortified meal mass and thoroughly admixed in the same manner. The product was slightly oily, so it was treated with methanol in order to increase the affinity of the meal mixture for fatty material. 2 parts of the slightly oily product were mixed with 1 part of methanol for five minutes at atmospheric pressure in a mechanical mixer to obtain initmate contact of the solvent with the meal particles. Vacuum was then applied to the mixer and the temperature of the mixer jacket raised somewhat to aid in driving off the methanol. The mass was then mixed under these conditions for about 25 minutes, at which time substantially all of the solvent had been removed. The treated product was completely non-oily and was free flowing. It had a vitamin potency of 6,520 I. U. of vitamin A/gm. and 2000 I. U. of vitamin D/gm. The product exhibited very good stability.

It is evident from the above description and examples that by the process of the invention it is possible to produce vitamin-containing products in a dry, finely divided form, which are highly stable. Such dry vitamin products are suitable for fortifying human and animal foods and feeds, such as cereals, flours, milk powders, dry or wet poultry mashes, prepared animal feeds, etc., or for the production of vitamin-containing tablets of increased stability by molding the products of the invention into tablets of suitable size with the aid of water, sugar solutions, or by coating tablets of the product with an exterior sugar or like coating, etc. In all cases, the dry vitamin product of the invention and the various food products fortified therewith will have their vitamin potency remain substantially constant over long periods of time, even when exposed to the oxidizing influences of the atmosphere.

In view of the great demand for such a product, it is evident that the products of our invention will be of great interest to those engaged in the production and use of vitamin-containing materials.

The term "crude vegetable oil" is used in the specification and claims to connote unrefined and partially refined vegetable oils and fractions thereof, i. e., vegetable oils which still contain at least a major portion of their original antioxidant content.

The oil-bearing seed meals used according to the invention may be produced by either the expeller, cold pressing or solvent extraction methods. Such meals usually contain a maximum of 5% to 8% fatty material and fall within the expression "relatively oil-free vegetable material."

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for preparing a stable fat-soluble vitamin-containing product in a dry form which comprises admixing a fat-soluble vitamin-containing fatty material with finely divided vegetable material having a high affinity for fatty material, and mixing the product thus obtained with a crude vegetable oil, the amount of fatty material incorporated into the vegetable material being controlled to yield a substantially non-oily product containing not more than about 30 per cent of fatty material.

2. A process for preparing a stable fat-soluble vitamin-containing product in a dry form which comprises admixing up to 10 parts of fat-soluble vitamin-containing fatty material with from 75 to 90 parts of finely divided vegetable material having a relatively high affinity for fatty materials, and mixing the product thus obtained with from 3 to 20 parts of crude vegetable oil, the amount of fatty material incorporated into the vegetable material being controlled to yield a substantially non-oily product containing between about 5 and about 30 per cent of fatty material.

3. The process of claim 1 wherein the finely divided vegetable material used is wheat germ pressed cake flour.

4. The process of claim 1 wherein the finely divided vegetable material used is linseed oil meal.

5. The process of claim 1 wherein the finely divided vegetable material used is dried distiller's grain solubles.

6. The process of claim 1 wherein the finely divided vegetable material used is characterized by containing a natural antioxidant.

7. A process for preparing a stable, fat-soluble vitamin food product in a dry form which comprises admixing a crude vegetable oil containing dissolved therein a fat-soluble vitamin-containing material with finely divided vegetable material having a relatively high affinity for fatty material, the amount of fatty material incorporated into the vegetable material being controlled to yield a substantially non-oily product containing not more than about 30 per cent of fatty material.

8. A process for preparing a stable fat-soluble vitamin-containing food product in a dry form which comprises admixing fat-soluble vitamin-containing material and a crude vegetable oil with finely divided vegetable material, and subsequently contacting the product obtained with a highly polar solvent substantially immiscible with fatty material in order to reduce any oiliness of the product, and then driving off the solvent by means of heat.

LORAN O. BUXTON.
HARRY J. KONEN.